United States Patent [19]

Deligny et al.

[11] Patent Number: 4,751,851
[45] Date of Patent: Jun. 21, 1988

[54] MECHANICAL CABLE CONTROL DEVICE WITH MANUAL ADJUSTMENT

[75] Inventors: Jean Deligny, Le Mans; Charles Guidicelli, Noyen, both of France

[73] Assignee: Societe des Cables du Mans, Le Mans, France

[21] Appl. No.: 921,643

[22] Filed: Oct. 20, 1986

[30] Foreign Application Priority Data

Oct. 25, 1985 [FR] France ................. 85 15883

[51] Int. Cl.⁴ .............................................. F16C 1/10
[52] U.S. Cl. ........................... 74/501.5 R; 192/111 A; 188/196 R
[58] Field of Search .................. 74/501.5 R, 501.R; 188/196 R, 196 H, 196 P; 192/111 A, 70.25, 30 W

[56] References Cited

U.S. PATENT DOCUMENTS

| | | | |
|---|---|---|---|
| 2,884,097 | 4/1959 | Stultz et al. | 188/196 R |
| 3,036,350 | 5/1962 | Hunt | 74/501.5 R |
| 3,572,159 | 3/1971 | Tschanz | 74/501 R |
| 3,605,520 | 9/1971 | Lorenz et al. | 74/501.5 R |
| 4,177,691 | 12/1979 | Fillmore | 74/501 R X |
| 4,231,316 | 11/1980 | Bland et al. | 74/501.5 R X |
| 4,235,046 | 11/1980 | Hess et al. | 74/501.5 R X |
| 4,274,300 | 6/1981 | Golobay | 74/501.5 R |
| 4,331,041 | 5/1982 | Bennett | 74/501.5 R |
| 4,378,713 | 4/1983 | Haskell et al. | 74/501.5 R |
| 4,464,950 | 8/1984 | Deligny | 74/501.5 R |
| 4,543,849 | 10/1985 | Yamamoto et al. | 74/501.5 R |
| 4,570,506 | 2/1986 | Yamamoto et al. | 74/501.5 R |
| 4,598,809 | 7/1986 | Glover et al. | 192/111 A |

FOREIGN PATENT DOCUMENTS

| | | | |
|---|---|---|---|
| 0048620 | 3/1982 | European Pat. Off. | |
| 120616 | 10/1984 | European Pat. Off. | 74/501.5 R |
| 2103891 | 8/1971 | Fed. Rep. of Germany | 74/501 R |
| 3116456 | 11/1982 | Fed. Rep. of Germany | |
| 3305417 | 6/1984 | Fed. Rep. of Germany | 74/501.5 R |
| 2420164 | 10/1979 | France | 74/501.5 R |
| 41788 | 3/1977 | Japan | 74/501.5 R |
| 80959 | 5/1982 | Japan | 74/501.5 R |
| 205260 | 12/1982 | Japan | 74/501.5 R |
| 205261 | 12/1982 | Japan | 74/501.5 R |
| 2016634 | 9/1979 | United Kingdom | 74/501.5 R |
| 2069090 | 8/1981 | United Kingdom | |
| 2088502 | 6/1982 | United Kingdom | 74/501.5 R |
| WO84/01196 | 3/1984 | United Kingdom | |
| WO85/03113 | 1/1985 | United Kingdom | |
| 2157789 | 10/1985 | United Kingdom | 74/501.5 R |
| 8401196 | 3/1984 | World Int. Prop. O. | 74/501.5 R |

Primary Examiner—Gary L. Smith
Assistant Examiner—Rodney M. Lindsey
Attorney, Agent, or Firm—Solon B. Kemon

[57] ABSTRACT

Mounted slideably on an outer connector structure (6), in which is received slideably an inner connector structure (5) having a toothed zone (8) for interaction with at least one locking member (13) mounted so as to be radially displaceable in the outer connector structure (6), is a tubular actuating member (14), on which bears an axially biasing spring (18) and which forms, together with the locking member (13), at least one pair of cooperating ramp surfaces (21, 23; 22, 24) controlling the radial displacement of the locking member (13).

8 Claims, 1 Drawing Sheet

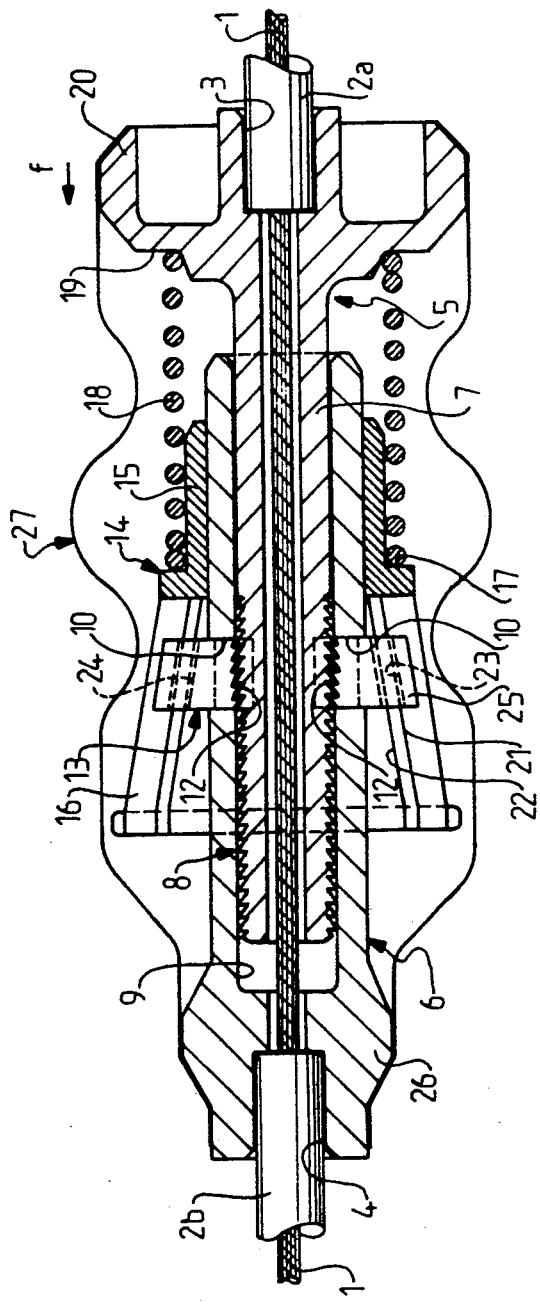
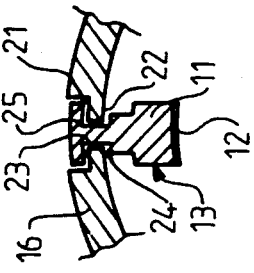
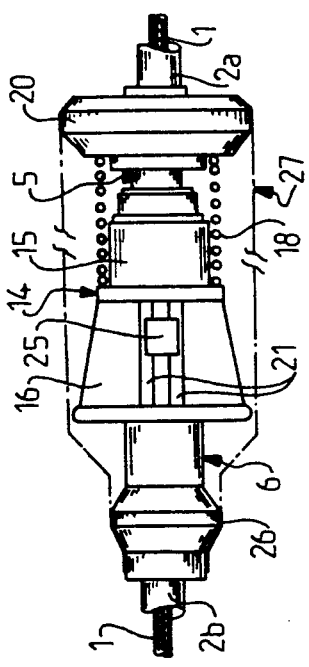

MECHANICAL CABLE CONTROL DEVICE WITH MANUAL ADJUSTMENT

The present invention relates to mechanical cable control devices of the type comprising a cable sliding in a cable sheath, for example for controlling the clutch or the brakes of vehicles, and having a tubular inner connector structure which is connected to a first end of the cable sheath and which is mounted slideably in a coaxial outer tubular connector structure and having a toothed outer zone, a manually actuatable locking member, comprising a toothed inner zone, mounted in the outer connector structure so that it can be displaced radially between a locking position, with its inner toothed zone cooperating in engagement with the outer toothed zone of the inner connector structure, and a release position, and a spring which axially biasses the inner connector structure in relation to the outer connector structure.

A mechanical cable control device of this kind is described in the document GB-A No. 1,302,383. In the device of this document, the first end of the cable sheath is mounted in an inner connector structure which passes through the outer structure and which is extended in the form of a tubular extension having a stop collar which, during the initial assembly of the device, comes to bear the outer end structure under the effect of a biassing spring located between another stop collar of the inner connector structure and the outer connector structure. The locking member of the slide type is mounted in a radial through-slot in the outer connector structure and is brought into the locking position by being forced radially around the inner connector structure, so as to secure the two connector structures to one another, after the inner connector structure has been displaced by hand counter to the axially biassing spring, to bring the corresponding end of the cable to the desired distance from the outer connector structure mounted in a stationary wall. The device of this document does not allow automatic adjustment of the mechanical cable-type control device when it is installed in situ, for example in a vehicle, since the arrangement of the locking member does not permit a subsequent operation possibly to make another adjustment, for example during a technical inspection after a certain operating time of the equipment, with which the mechanical cable control device is associated.

It is an object of the present invention to provide an improved mechanical cable control device of reliable and robust design and entailing low production costs, which allows an automatic length adjustment during installation in situ and which makes it possible in a very simple way to carry out a subsequent operation to make an additional length adjustment which again takes place automatically.

For this purpose, according to a feature of the invention, the device has an actuating member mounted slideably on the outer connector structure, the locking member and the actuating member having a first pair of cooperating ramp surfaces designed so that an axial displacement of the actuating member in a first direction biases the locking member displaceably towards its release position, the axially biassing spring being located between the inner connector structure and the actuating member and biassing the latter in a second axial direction opposite the first direction.

According to another feature of the invention, the locking member and the actuating member have a second pair of cooperating ramp surfaces designed so that an axial displacement of the actuating member in the second direction biases the locking member displaceably towards its locking position.

According to yet another feature of the invention, the cable sheath is divided into two axially separate portions, each secured to an associated connector structure.

By means of an arrangement according to the invention, not necessarily associated with a stationary partition, when the mechanical cable-control device is installed in situ with the cable ends connected respectively to the actuating member and to the member to be actuated, a simple axial pressure exerted on the actuating member to displace it relative to the outer connector structure counter to the biassing spring allows the latter to put the cable duct under compression in order to recover automatically the existing functional plays. When the actuating member is released, the device assumes a locked configuration which it will maintain until a possible subsequent identical operation by means of simple action on the actuating member, in order to correct, again automatically, the functional plays which could have occurred during the operating time of the system associated with the cable control device.

It is another object of the present invention to provide a mechanical cable control device of the kind mentioned above, having a protective sealing casing of simplified design and entailing low production and installation costs.

For this purpose, according to another feature of the invention, the connector structures each have a zone of widened diameter on either side of the actuating member, one of these zones of widened diameter having an outside diameter greater than the maximum outside diameter of the actuating member, the protective casing consisting of a tubular film made of stretchable plastic which is stretched by being engaged over this first zone of widened diameter and then secured to the two zones of widened diameter, advantageously by simple bonding or heat-sealing.

The invention will now be described by way of example with reference to the attached drawings, in which:

FIG. 1 is a longitudinal sectional view of a mechanical cable control device according to the invention;

FIG. 2 is a partial cross-sectional view in the sectional plane 2 of FIG. 1; and FIG. 3 is a plan view of the device of FIG. 1.

In the embodiment illustrated in the Figures, the mechanical cable control device comprises a length of actuating cable 1 extending slideably in a cable sheath separated, here, into two axially separate sheath portions 2a, 2b, the adjacent ends of which are mounted in recesses 3 and 4 of a tubular inner connector structure 5 and of a tubular outer connector structure 6, respectively, these being arranged at any intermediate point on the mechanical cable control. The inner connector structure 5 has a tubular shank 7, through which passes the free part of the cable 1 between the sheath portions 2a and 2b and which has an externally toothed end zone 8 mounted slideably in a blind bore 9 in the outer connector structure 6. The latter has at least one, typically two diametrically opposed radial openings 10, in which are received radially slideably body parts 11, having inner teeth 12, of locking members, designated as a whole by the reference 13. Mounted slideably on the cylindrical main part of the outer connector structure 6 is an actuating member, designated as a whole by the reference 14, which has a cylindrical part 15 engaged on the connector structure 6 and extended in the form of an outwardly widening conical part 16 connected to the cylindrical sliding-guide part 15 by means of a shoulder 17 forming a bearing for an axially biassing spring 18 coaxial relative to the cylindrical part 15 of the actuating member 14 and relative to the connector structures 5 and 6, and bearing by its other end on a shoulder 19 formed by an end of widened diameter 20 of the inner connector structure 5 opposite the toothed end zone 8 of the latter.

As can be seen clearly in FIG. 2, in the conical part 16 of the actuating member 14 there are two T-shaped slots, each defining two first outer ramp surfaces 21 and two inner ramp surfaces 22 cooperating with corresponding ramp surfaces 23 and 24 formed by an outer part 25 of the locking member 13, which has at least one, typically two opposing symmetrical lateral U-shaped profiles, so as to be axially slideably received in the T-shaped slot of the conical part 16 of the actuating member 14.

It will be appreciated that the axial biassing spring 18, acting between the connector structures 5 and 6 by means of the actuating member 14 and the locking members 13, normally maintains the device in the locked configuration shown in FIG. 1, the spring 18 maintaining, even in the presence of vibrations, the wedge effect exerted by the ramp surfaces 22 of the actuating member 14 on the ramp surfaces 24 of the locking members 13, so as to keep the teeth 12 of the latter firmly engaged with the teeth 8 of the inner connector structure 5. In contrast to this, by axially displacing the actuating member 14 towards the right in FIG. 1 in relation to the outer connector structure 6 counter to the spring 18, the upper ramp surfaces 21 of the T-shaped slots of the actuating member 14, as a result of interaction with the ramp surfaces 23 of the locking members 13, shift the latter radially outwards, thus allowing the inner connector structure 5 to be displaced axially relative to the outer connector structure 6, so as to assume the necessary relative position under the effect of the spring 18. When the actuating member 14 is released, the spring 18 immediately makes the actuating member 14 relock the locking members 13 in engagement with the teeth of the inner connector structure 5.

As can be seen clearly in FIG. 1, the teeth 8 of the inner connector structure 5, which are parallel to one another and are not distributed according to a helical pitch, have an inclination towards the end of the inner connector structure 5 opposite the end of widened diameter 20, the teeth of the locking members 13 having a corresponding inclination. The conicity of the conical part 16 of the actuating member 14 is typically of about 10 to 12 degrees. The assembly consisting of the component elements of the adjustment device (with the exception of the spring 18) is advantageously made of thermoplastics, preferably reinforced with glass fibres, for example in a proportion of 30%, advantageously of polybutylene terephthalate (PBT) or polyamide.

According to another aspect of the invention, as can be seen clearly in the drawings, the outer connector structure 6 also has, opposite its cylindrical main part, an end part of widened diameter 26 which, like the end part of widened diameter 20 of the inner connector structure 5, has a cylindrical peripheral zone extended in the form of a part converging outwards. One of these end zones of widened diameter, in this particular case the end 20 of the inner connector structure 5, has an outside diameter greater than the maximum outside diameter of the conical part 16 of the actuating member 14, the end part of widened diameter 26 of the other connector structure 6 having an outside diameter less than this maximum outside diameter of the actuating member 14. According to one aspect of the invention, there is force-fitted on the end part of largest diameter 20 axially, as indicated by the arrow f in FIG. 1, a tubular film of stretchable plastic, for example polyethylene, which has a nominal diameter at rest less than the diameter of the small end of widened diameter 26, the tubular film stretched in this way being cut with an excess length necessary to ensure that it has intermediate corrugations, and then being secured to the periphery of the ends of widened diameter 20, 26 by being bonded or heat-sealed to the plastic constituting the connector structures, thus forming a particularly cheap protective sealing casing 27 isolating the sliding zones of the connector structures, the actuating member and the locking members from external contaminations.

Although the present invention has been described in relation to a particular embodiment, it is not limited to this, but on the contrary is capable of experiencing modifications and alternative forms which will appear to a person skilled in the art. In particular, instead of two connector structures provided at an intermediate point on the mechanical cable control between two separate portions of the cable sheath the outer connector structure 6 can be mounted in an opening in a stationery wall in the vicinity of the actuating member or of the member to be actuated which are coupled to the cable 1.

We claim:

1. Mechanical cable-control device with manual adjustment comprising a cable sliding in a cable sheath, a tubular inner connector structure connected to a first end of the cable sheath, mounted slideably in a coaxial outer tubular connector structure and having a toothed outer zone, a manually actuatable locking member having a toothed inner zone and mounted in the outer connector structure so as to be radially displaceable between a locking position, with its inner toothed zone cooperating in engagement with said outer toothed zone of said inner connector structure, and a release position, and a spring axially biassing said inner connector structure in relation to said outer connector structure, an actuating member mounted slideably on said outer connector structure, said actuating member and said locking member having a first pair of cooperating ramp surfaces designed so that an axial displacement of said actuating member in a first direction biasses said locking member displaceably towards its release position, said spring being arranged between said inner connector structure and said actuating member and biassing the latter in a second direction opposite the said first direction, said actuating member and said locking member having a second pair of cooperating ramp surfaces designed so that an axial displacement of said actuating member in said second direction biasses said locking member towards its locking position, wherein said actuating member is tubular and has a cylindrical part mounted slideably on said outer connector structure and a conical part widening in the opposite direction to said spring and forming said ramp surfaces.

2. Device according to claim 1, wherein said ramp surfaces of said actuating member are formed by an axially extending T-shaped slot formed in said conical part, said locking member having an outer part with at least one lateral U-shaped profile engaged in the T-shaped slot.

3. Device according to claim 1, wherein said conical part is connected to said cylindrical part by means of a shoulder forming a bearing for said spring.

4. Device according to claim 1, wherein said inner conector structure and outer connector structure each having a zone of widened diameter on either side of said actuating member, for the fitting of a tubular protective casing.

5. Device according to claim 4, wherein a first of said zones of widened diameter has an outside diameter greater than the maximum outside diameter of said actuating member said protective casing consisting of a tubular film made of stretchable plastic material which is stretched by being engaged axially over this first zone of widened diameter and then secured to said zones of widened diameter.

6. Device according to claim 5, wherein said tubular film consists of polyethylene.

7. Device according to claim 1, wherein said connector structures, said locking member and said actuating member are made of plastics.

8. Device according to claim 1, wherein said cable sheath is divided into two sheath portions, each secured to an associated connector structure.

* * * * *